US009718938B2

(12) United States Patent
Costeux et al.

(10) Patent No.: US 9,718,938 B2
(45) Date of Patent: Aug. 1, 2017

(54) NANOPOROUS POLYMERIC FOAM HAVING HIGH POROSITY

(75) Inventors: Stéphane Costeux, Midland, MI (US); Lingbo Zhu, Midland, MI (US); Christopher M. Weikart, Midland, MI (US); Thomas H. Kalantar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 809 days.

(21) Appl. No.: 13/504,561

(22) PCT Filed: Nov. 1, 2010

(86) PCT No.: PCT/US2010/054921
§ 371 (c)(1),
(2), (4) Date: Apr. 27, 2012

(87) PCT Pub. No.: WO2011/066060
PCT Pub. Date: Jun. 3, 2011

(65) Prior Publication Data
US 2012/0225272 A1    Sep. 6, 2012

Related U.S. Application Data

(60) Provisional application No. 61/264,407, filed on Nov. 25, 2009.

(51) Int. Cl.
*C08J 9/00* (2006.01)
*C08J 9/12* (2006.01)

(52) U.S. Cl.
CPC ........... *C08J 9/0066* (2013.01); *C08J 9/0023* (2013.01); *C08J 9/0071* (2013.01); *C08J 9/122* (2013.01); *C08J 2201/024* (2013.01); *C08J 2201/03* (2013.01)

(58) Field of Classification Search
None
See application file for complete search history.

(56) References Cited

U.S. PATENT DOCUMENTS

| | | | | |
|---|---|---|---|---|
| 3,975,473 | A * | 8/1976 | Mulvaney | 264/406 |
| 5,955,511 | A | 9/1999 | Handa et al. | |
| 7,026,365 | B2 | 4/2006 | Lee et al. | |
| 7,045,556 | B2 * | 5/2006 | Handa et al. | 521/98 |
| 2002/0128336 | A1 * | 9/2002 | Kolb et al. | 521/50 |
| 2002/0168509 | A1 * | 11/2002 | DeSimone et al. | 428/310.5 |
| 2005/0042437 | A1 * | 2/2005 | Ramesh et al. | 428/304.4 |
| 2007/0059511 | A1 * | 3/2007 | Edwards et al. | 428/304.4 |
| 2008/0188577 | A1 * | 8/2008 | Schmidt et al. | 521/63 |
| 2008/0214689 | A1 | 9/2008 | Yang et al. | |
| 2009/0148665 | A1 | 6/2009 | Thiagarajan et al. | |
| 2009/0247654 | A1 * | 10/2009 | Rajendran et al. | 521/60 |

FOREIGN PATENT DOCUMENTS

| | | |
|---|---|---|
| WO | 2005092959 | 10/2005 |
| WO | 2005095502 | 10/2005 |
| WO | WO 2005092959 A1 * | 10/2005 |
| WO | 2009092505 | 7/2009 |

OTHER PUBLICATIONS

Allmendinger et al., Nanoporous Polymer Foams Formed From Multiphase Polymer Mixtures Containing Foaming Agents, Oct. 6, 2005, machine translation of WO2005/092959.*
Lee et al., Journal of Non-crystalline Solids, Mar. 2002, vol. 298, pp. 287-292.
Kumar and Suh, Polymer Engineering and Science, Oct. 1990, vol. 30.
Ramesh and Lee, Cellular Polymers, vol. 24, No. 5 (2005) pp. 269-277.
Ramesh et al., Polymer Engineering and Science, Nov. 1994, vol. 34, No. 22, pp. 1698-1706.
Handa and Zhang, Journal of Polymer Science: Part B: Polymer Physics, Vo. 38, 716-725 (2000).
Nawaby et al., Polymer International, vol. 56, 67-73 (2007).
Satish and Beckman, Polymer Engineering and Science, Jul. 1994, vol. 34, No. 14, 1148-1156.
Krause et al. Macromolecules, vol. 34, 874-884 (2001).
Srinivas Siripurapu et al., Macromolecules, vol. 38, 2271-2280 (2005).
Ito, Yamashita and Okamoto, Macromolecular Materials and Engineering, vol. 291, 773-783 (2006).
Fujimoto et al., Macromolecular Rapid Communications, vol. 24, No. 7, 457-461 (2003).
Yu, Ikeya and Okamoto, Polymer, vol. 47, 5350-5359 (2006).

* cited by examiner

*Primary Examiner* — Alicia Chevalier
(74) *Attorney, Agent, or Firm* — Steven W. Mork

(57) ABSTRACT

Prepare a polymeric foam article having a thermoplastic polymer matrix defining multiple cells therein, wherein the polymeric foam article has the following characteristics: (a) the thermoplastic polymer matrix contains dispersed within it nano-sized nucleating additive particles that have at least two orthogonal dimensions that are less than 30 nanometers in length; (b) possesses at least one of the following two characteristics: (i) has an effective nucleation site density of at least $3 \times 10^{14}$ sites per cubic centimeter of pre-foamed material; and (ii) has an average cell size of 300 nanometers or less; and (c) has a porosity percentage of more than 50 percent by rapidly expanding at a foaming temperature a foamable polymer composition containing the nucleating additive and a blowing agent containing at least one of carbon dioxide, nitrogen and argon.

20 Claims, 3 Drawing Sheets

NANOPOROUS POLYMERIC FOAM HAVING HIGH POROSITY

CROSS REFERENCE STATEMENT

This application claims the benefit of U.S. Provisional Application No. 61/264,407, filed Nov. 25, 2009, the entire content of which is incorporated herein by reference.

BACKGROUND OF THE INVENTION

Field of the Invention

The present invention relates to nanoporous polymeric foam articles and processes for preparing the polymeric foam articles.

Description of Related Art

Polymeric foam articles (or simply "polymeric foams") are common in thermal insulation applications. Many characteristics of polymeric foams affect the thermal conductivity through the foam and, hence, the effectiveness of the foam as a thermal insulator. For instance, it is known that heat transfer through polymeric foam insulation can occur by conduction, radiation and convection (see, for example, teachings in United States patent application publication 2009/0148665). In typical polymeric foam insulation the dominant mode of heat transfer is cell gas conduction, which contributes approximately 75 percent (%) of the total thermal conductivity. Hence, reducing conduction of cell gas can significantly reduce heat transfer through polymeric foams.

One characteristic affecting thermal conductivity contribution of cell gas is cell size. Cell size has little influence on gas thermal conduction when the cell size is between about one micron and one millimeter in size. Above one millimeter convection behavior tends to increase thermal conductivity. When the cell size of foam is less than about one micron the gas conductivity decreases due to what is known as the Knudsen Effect (see, for example, the relationship illustrated in FIG. 1. The curve follows the methodology in Lee, et al., "Determination of a mesopore size of aerogels from thermal conductivity measurement", Journal of Non-Crystalline Solids, March 2002, Vol. 298, pages 287-292). The Knudsen Effect is a phenomenon that results in a decrease in thermal conductivity as fewer cell gas molecules are available within each cell to collide and transfer heat within each single cell. The Knudsen Effect becomes significant as the cell size and connectivity between cells becomes on the same order of magnitude as the mean free path of the gas filling the cells. Thermal conductivity due to cell gas reduces almost in half when the cell size reduces from one micron to 300 nanometer (nm), and reduces by almost ⅔ when the cell size reduces from one micron to below 100 nm.

Homogeneous cell sizes in this range are desirable to maximize the Knudsen Effect in view of the fact that even occasional large cells can reduce the thermal insulation effect of the small (300 nm or less, preferably 150 nm or less) cells. Therefore, all things being equal, reducing the average cell size of foam to 300 nm or less and particularly to 150 nm or less is desirable to achieve lower thermal conductivity through the foam, especially in foam having a homogeneous cell size distribution. However, it is difficult to reduce the cell size without affecting other properties of a polymeric foam article.

Porosity, the ratio of void volume to foam volume, also affects the thermal conductivity of polymeric foam. Generally, decreasing porosity results in an increase in thermal conductivity. That is because thermal conductivity through the polymer network that makes up the walls defining cells of foam is typically greater than thermal conductivity across gas within the cells.

Polymeric foam having an average cell size of 300 nm or less and a porosity of greater than 0.50 is highly desirable but difficult, and highly improbable, to achieve with known blown foam technology heretofore. Notably, blown foam technology is desirable because unlike aerogel technology, for instance, blown foam technology does not require large volumes of solvents to manufacture.

In developing a process for producing foam having a particular cell size it is useful to consider the number of effective nucleation sites. Effective nucleation sites are the number of sites in a foamable polymer composition that form voids, or cells, when the foamable polymer composition expands into foam (also known as "cell density" in, for example, a paper entitled "A Process for Making Microcellular Thermoplastic Parts" by Kumar and Suh, Polymer Engineering and Science, October 1990, Vo. 30 No. 20, pages 1323-1329). By controlling the number of effective nucleation sites and the porosity one controls the average cell size of the foam. In order to achieve a desirable thermally insulating foam it is desirable to prepare polymeric foam having at least $3 \times 10^{14}$ effective nucleation sites per cubic centimeter of foamable polymer composition and expand that to have a porosity that is greater than 0.50 (porosity percentage greater than 50%).

It would be a desirable advancement in the art of thermally insulating polymer foam to be able to prepare polymeric foam having at least $3 \times 10^{14}$ effective nucleation sites per cubic centimeter of foamable polymer composition and that has expanded to have a porosity percentage that is greater than 50%. Even more desirable would be such polymeric foam that has an average cell size of 300 nm or less, preferably 250 nm or less, and more preferably 200 nm or less, still more preferably 150 nm or less.

BRIEF SUMMARY OF THE INVENTION

The present invention provides a solution to the problem of preparing polymeric foam having at least $3 \times 10^{14}$ effective nucleation sites per cubic centimeter of foamable polymer composition and that has expanded to have a porosity percentage that is greater than 50%. Even more, the present invention can provide such polymeric foam having an average cell size of 300 nm or less, even 250 nm or less, even 150 nm or less. Yet more, the foam can have a homogeneous cell size distribution. Still more, the process of the present invention offers a process for producing such polymeric foam.

Surprisingly, a necessary component in the present solution to the problem is a nano-sized nucleating agent additive having at least two, preferably three, orthogonal dimensions that are less than 30 nanometers dispersed within the foamable polymer composition and resulting polymeric foam.

In a first aspect, the present invention is a polymeric foam article comprising a thermoplastic polymer matrix defining multiple cells therein, wherein the polymeric foam article has the following characteristics: (a) the thermoplastic polymer matrix contains dispersed within it nano-sized nucleating additive particles that have at least two orthogonal dimensions that are less than 30 nanometers in length; (b) possesses at least one of the following two characteristics: (i) has an effective nucleation site density of at least $3 \times 10^{14}$ sites per cubic centimeter of pre-foamed material; and (ii) has an average cell size of 300 nanometers or less; and (c) has a porosity percentage of more than 50 percent.

In a second aspect, the present invention is a process for preparing the polymeric foam article of the first aspect, the process comprising: (a) providing at a foaming temperature and initial pressure a foamable polymer composition that comprises a thermoplastic polymer matrix, a nano-sized nucleating additive and a blowing agent containing at least one blowing agent selected from carbon dioxide, nitrogen and argon, where at the foaming temperature the foamable polymer composition is in a softened state and the initial pressure is high enough to preclude foaming; and (b) rapidly exposing the foamable polymer composition to a pressure below the initial pressure while allowing the foamable polymer composition to expand into a polymeric foam article; wherein the nano-sized nucleating additive has at least two orthogonal dimensions that are less than 30 nanometers and is dispersed within the thermoplastic polymer matrix.

The process of the present invention is useful for preparing the foam article of the present invention. The foam article of the present invention is useful for thermal insulation application such as insulating building structures and coolers as well as for filter materials, porous membranes, energy absorbing materials and controlled-release matrices.

DETAILED DESCRIPTION OF THE INVENTION

Figure 1:
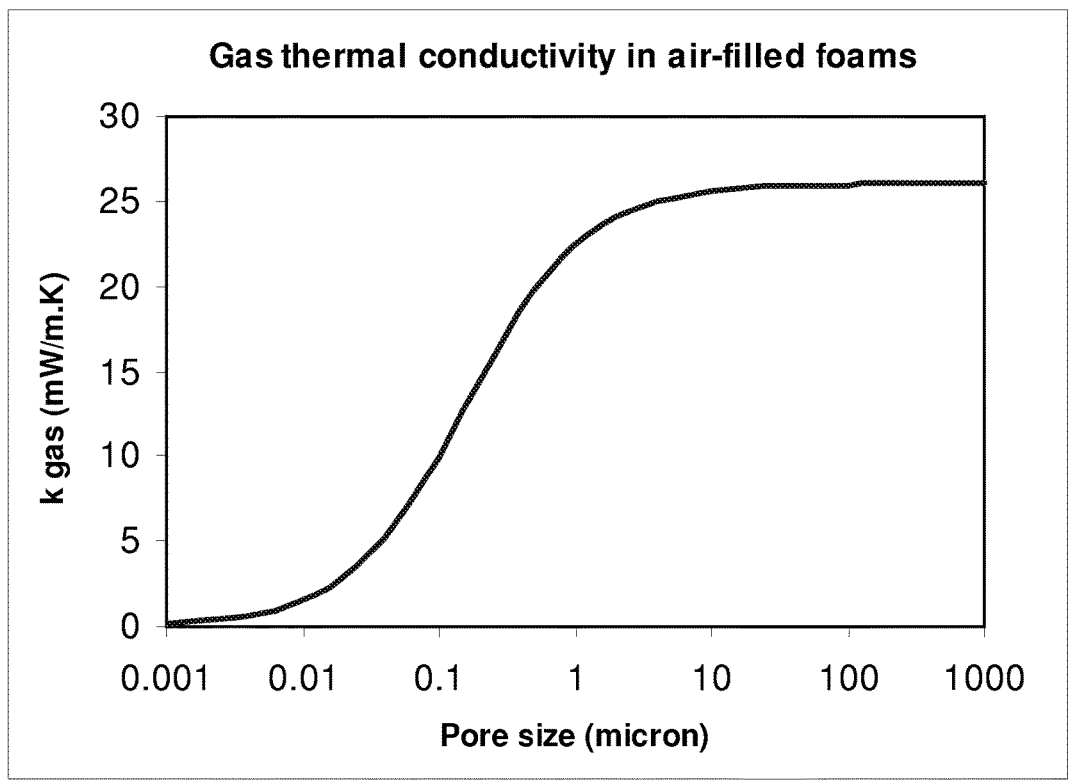
FIG. 1 illustrates a theoretical relationship between cell gas thermal conductivity contribution to polymeric foam thermal conductivity for air as cell gas as a function of average cell size of polymeric foam.

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutsches Institute für Normung; and ISO refers to International Organization for Standards.

Foam articles have three mutually perpendicular dimensions: length, width and thickness. The length dimension lies along the longest dimension of a foam article and typically is along the extrusion direction of an extruded foam article. The thickness dimension is the dimension that has the smallest magnitude but can be equal to the length in, for example, a cube. Width is mutually perpendicular to length and thickness and can have a magnitude equal to or less than the length and equal to or greater than the thickness.

"And/or" means "and, or as an alternative". All ranges include endpoints unless otherwise indicated.

"Copolymer" means molecules containing two or more monomer and/or polymer components that are either copolymerized or grafted to form a single molecule.

The polymeric foam article of the present invention comprises a continuous thermoplastic polymer matrix defining multiple cells therein. The continuous thermoplastic polymer matrix comprises a continuous thermoplastic polymer phase and is typically more than 50 percent by weight (wt %), desirably 75 wt % or more, preferably 80 wt % or more and can be 90 wt % or more, 95 wt % or more and even 100 wt % thermoplastic polymer where wt % is relative to total weight of polymer in the thermoplastic polymer matrix.

In the broadest embodiment of the present invention the thermoplastic polymer is without limitation and can be any thermoplastic polymer or combination of thermoplastic polymers. Suitable thermoplastic polymers include styrenic polymers including polystyrene homopolymer and polystyrene copolymers. Particular examples of suitable polystyrene copolymers include styrene-acrylonitrile (SAN) copolymer and styrene-rubber copolymers known as high impact polystyrene (HIPS), or styrene-butadiene-acrylonitrile copolymers (ABS). Suitable thermoplastic polymers also include acrylic polymers such as poly(methylmethacrylate) (PMMA), poly(ethyl methacrylate) (PEMA), as well as acrylic random and block copolymers. Block copolymers in which blocks are made from the suitable thermoplastic polymers are also examples of suitable polymers. Desirably, the thermoplastic polymer is a single amorphous thermoplastic polymer or blend of multiple thermoplastic polymers that forms a single amorphous phase.

While foam articles having average cell sizes less than one micron are made of polycarbonate, poly(lactic acid), polyether imide, polyether sulfone or fluorinated polymers, the continuous thermoplastic polymer matrix of the present polymeric foam article can be free of polycarbonate, poly(lactic acid), fluorinated polymers or free of any combination of two or all three of polycarbonate, poly(lactic acid) and fluorinated polymers. The continuous thermoplastic polymer matrix typically has a continuous non-fluorinated thermoplastic polymer other than polycarbonate and poly-lactic acid.

The continuous thermoplastic polymer matrix defines multiple cells, which are the cells of the polymeric foam article. The volume of the cells is sufficient to establish a porosity of greater than 0.50 (porosity percentage greater than 50%) in the polymeric foam article. Porosity serves as a measure of void volume fraction in a foam article. One way to measure porosity in a foam article is by determining the density ($\rho$) of non-void material in the foam article (that is, the continuous thermoplastic polymer matrix plus any additives and fillers dispersed in the matrix) and the density of the foam article ($\rho_f$) and then solve for porosity (p) using the following equation:

$$p = [1 - (\rho_f)/(\rho)]$$

Porosity can also be reported as a porosity percentage by using:

$$p\ \% = [1 - (\rho_f)/(\rho)] \times 100\%$$

Determine the density of the polymeric foam article ($\rho_f$) by the Archimedes method of ASTM method D-1622-03.

Desirably, the porosity percentage of thermoplastic polymer foam article of the present invention is 60% or more, preferably 70% or more and can be 75% or more, 80% or more and even 90% or more.

The polymeric foam article possesses at least one of the following average cell size characteristics and effective nucleation site density characteristic and can possess any combination of both an average cell size characteristic embodiment and an effective nucleation site density characteristic embodiment. Most desirably, the polymeric foam article possesses a characteristic selected from the effective nucleation site density characteristic.

Desirably, the polymeric foam article has an average cell size of 300 nanometers (nm) or less, preferably 250 nm or less, still more preferably 200 nm or less and can have an average cell size of 150 nm or less and even 100 nm or less. Typically, the average cell size is at least 20 nm, or even at least 40 nm. Desirably, the polymeric foam article is substantially free of large cells, meaning that the volume percent of cells larger than one micron is 10% or less, preferably 5% or less and still more preferably one percent or less relative to total foam volume. Notably, the polymeric foam can appear as a reticulated or reticular structure of polymeric struts in which case cells sizes correspond to the openings between struts.

Desirably, the polymeric foam article of the present invention is free of a non-foamed skin (that is, a portion of the article on the surface of the article that has a porosity percentage of less than 10%) on one or more surface that has a thickness exceeding five percent of the total thickness of the polymeric foam article. Measure thickness of the skin and foam in the same dimension.

Measure average cell size directly for a polymeric foam article according to the following procedure: (a) Examine a cross section of a polymeric foam article by scanning electron microscopy (SEM); (b) Examine at a first portion of the cross section that is five microns by five microns in dimensions; (c) Select five to ten groupings of ten to twenty cells; (d) Within each grouping select what appears to be an average-sized cell and measure the diameter of that cell and in a case where no cell representing an reasonable average size is evident (for example, in a bimodal cell size distribution where there are large and small cells but none representing an average of the large and small sizes) then measure at least 10 random cells in the grouping and determine the mean of the those 10 cells; (e) repeat steps (c) and (d) on four to ten additional portions of the same cross section of polymeric foam article; (f) determine the average of all measured diameters and use that average value as the average cell size for the polymeric foam article. This process should include several hundred cells in determining the average—that is several hundred diameters should be measured and then averaged in step (f).

Desirably, the cell size has a monomodal cell size distribution. However, in any embodiment where the cells size distribution is other than monomodal the process of measuring average cell size should incorporate selection of cells for measuring diameter without consideration of whether the cell size is large or small in order to obtain a true average cell size.

For optimal thermal insulation properties it is desirable for 70% or more, preferably 80% or more and still more preferably 85% or more of all cells in the polymeric foam article have a cell size of less than 300 nanometers. It is even more desirable for 70% or more, preferably 80% or more and still more preferably 85% or more of all cells in the polymeric foam article have a cell size of less than 150 nanometers.

The polymeric foam article desirably has an effective nucleation site density of at least $3 \times 10^{14}$ sites per cubic centimeter ($cm^3$) of pre-foamed material (foamable polymer composition). The number of effective nucleation sites is equivalent to the number of nucleation sites that develop into a unique cell in the final foam. To be clear, cells that independently nucleate but that coalesce into a single cell correspond to a single effective nucleation site. Cells that nucleate, but collapse and disappear prior to formation of the final foam do not count as effective nucleation sites. Preferred embodiments of the thermoplastic polymeric foam article have an effective nucleation site density of $1 \times 10^{15}$ or more, preferably $3 \times 10^{15}$ or more, still more preferably $1 \times 10^{16}$ or more and can be $1 \times 10^{17}$ or more. Typically, the effective nucleation site density is less than about $1 \times 10^{19}$ in order to achieve porosity percentage greater than 50%.

Determine the effective nucleation site density ($N_O$) for a polymeric foam article from the porosity (p) of the polymeric foam article, the average cell size in nanometers ($d_{nm}$), the density of the polymeric foam article ($\rho_f$) and density of non-void material in the foam article ($\rho$), both in grams per cubic centimeter ($g/cm^3$). Start by calculating the average cell volume ($V_{cell}$) using:

$$V_{cell} = \frac{\pi d_{nm}^3 / 6}{10^{21}}$$

Determine the average number of cells per cubic centimeter of foam ($N_c$) using:

$$N_c = \frac{p}{V_{cell}} = \left[ 10^{21} \frac{1 - \rho_f / \rho_p}{\pi d_{nm}^3 / 6} \right]$$

Determine the effective nucleation density ($N_O$) using:

$$N_0 = \frac{N_c}{1-p} = \left[ 10^{21} \frac{\rho_p / \rho_f - 1}{\pi d_{nm}^3 / 6} \right]$$

Figure 2:
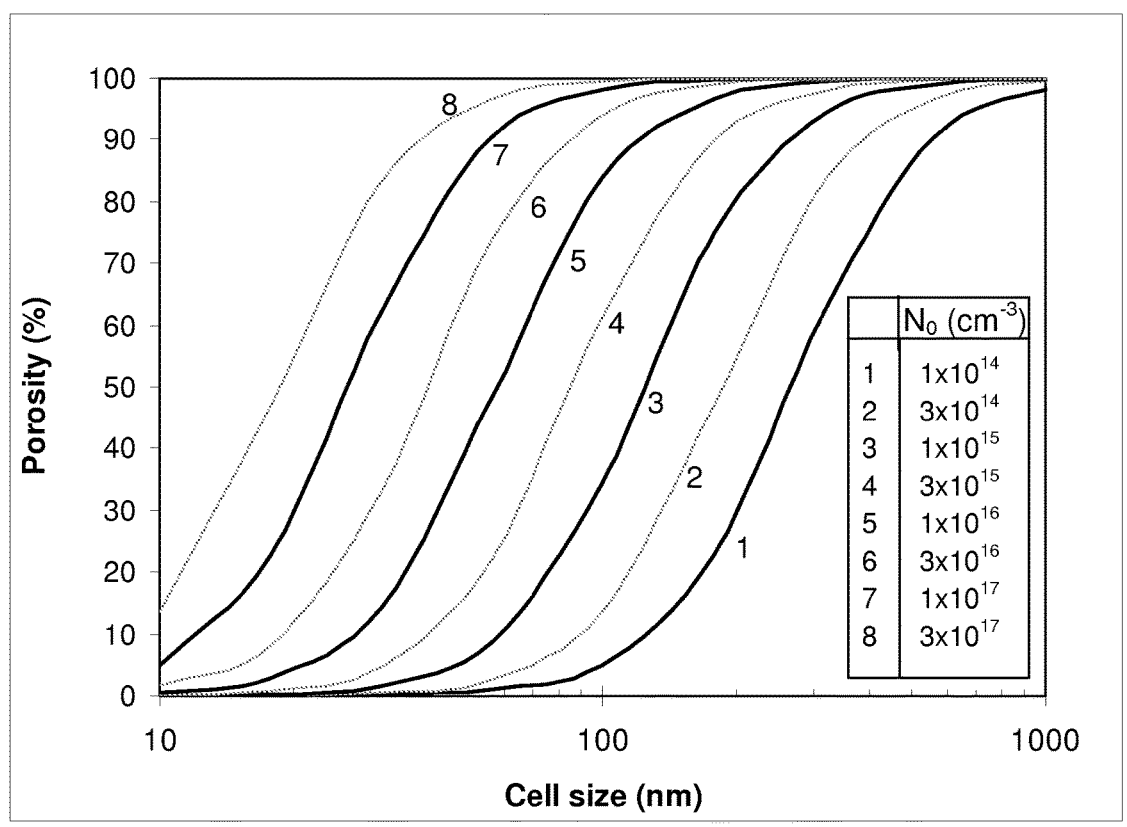
FIG. 2 illustrates a plot that correlates Nucleation Site Density to Average Cell Size and Porosity for a polymeric foam article.
Figure 3:
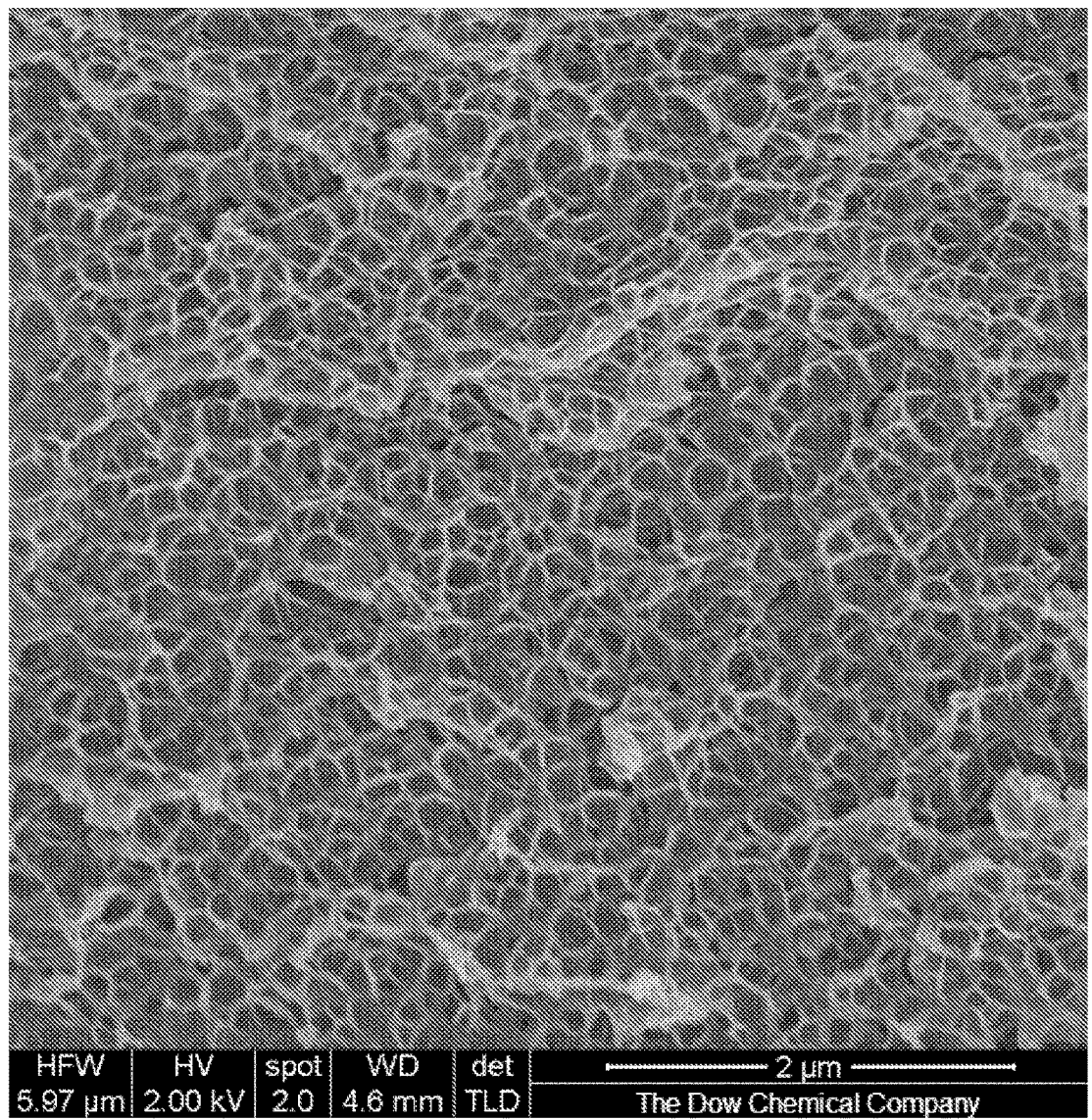
FIG. 3 is a scanning electron micrograph of a foam article of the present invention.

Porosity, effective nucleation site density and average cell size are all inter-related and any two of the values allows calculating of the third. FIG. 2 illustrates a plot of porosity percentage versus average cell size and includes lines designating effective nucleation site density values. Such a plot allows one to use any two of porosity, average cell size and effective nucleation site density to determine the third.

An essential part to preparing the polymeric foam articles of the present invention is the presence of a specific type of nucleating additive. Surprisingly, the nucleating additive comprises nano-sized particles that have at least two orthogonal dimensions that are less then 30 nanometers in length. Ideally, all dimensions of the nano-sized nucleating additive are less than 30 nanometers. The nano-sized nucleating additive can be solid or porous. Examples of suitable nano-sized nucleating additive materials include silica, magnesium oxide, zirconium oxide, calcium carbonate, calcium oxide, titanium dioxide, crystalline materials (for example salt and sugar) and polymeric nanoparticles. Particularly desirable nano-sized nucleating additive materials include polyhedral oligomeric silsesquioxanes (POSS) and silica. The nucleating additive can be amorphous or crystalline.

Desirably, the nucleating additive is dispersed within the thermoplastic polymer matrix so as to have a number average particle size of less than 30 nanometers, preferably 20 nm or less and still more preferably 10 nm or less. Determine the number average particle size of the nucleating additive by small angle x-ray scattering (SAXS). It is possible to disperse the nucleating additive ineffectively so as to achieve clumping or agglomerating of the nucleating additive particles. If the nucleating clumps or groups become too large they do not effectively nucleate the nanoscale cells of the present invention. For that reason, the number average particle size is desirably in the aforementioned ranges. An exception to this desirable number average size range is for nucleating additive particles that have a high aspect ratio. For high aspect ratio particles (that is, particles having an aspect ratio of 10 or more) it is sufficient that one or two dimensions be less than 30 nm.

The fact that a nano-sized particle serves as an effective nucleator, let alone as a nucleator that serves to provide the unique foam of the present invention is surprising over what is known in the art. For example, N. S Ramesh and S. T. Lee discovered that nanoclay does not produce finer cells than talc in polypropylene or improve cellular structure in polyolefins (Cellular Polymers, Vol. 24, No. 5, 2005 (269-277)). Ramesh et al. also discovered that rubber particle additives having a radius of 0.2 microns (diameter of 0.4 microns) or less actually cause a decrease in cell density (that is, effective nucleation site density) (see, Polymer Engineering and Science, November 1994, Vol. 34, No. 22 (1698-1706)). In view of these teachings it is particularly surprising that nano-size nucleating additive of the present invention actually increases effective nucleation site density and produces high porosity values.

The amount of nano-sized nucleating additive in the polymeric foam is typically 10 ppm or more and 10 wt % or less where ppm is weight-parts per million weight parts total polymer in the polymeric foam article and wt % is relative to total polymer weight in the foam article. Preferably, the nano-sized nucleating additive is present at a concentration of 100 ppm or more and 5 wt % or less. Even more preferably, the nano-size nucleating additive is present at a concentration of 1000 ppm or more and one wt % or less.

The present polymeric foam articles are distinct from foamed thin polymeric films. The present polymeric foam articles desirably have a thickness that is greater than one millimeter, preferably greater than two millimeters, still more preferably greater than three millimeters and even more preferably greater than four millimeters. The thickness of the present polymeric foam articles can be five millimeters or more, and even ten millimeters or more, even 25 millimeters or more and 50 millimeters or more. An upper limit on thickness is only limited by process equipment. Typically, the thickness of the present polymeric foam article is 250 millimeters or less.

The polymeric foam of the present invention can further comprise additional additives beside the nano-sized nucleating filler. Examples of suitable additional additives include: infrared attenuating agents (for example, carbon black, graphite, metal flake, titanium dioxide or other metal oxides); clays such as natural absorbent clays (for example, kaolinite and montmorillonite) and synthetic clays; fillers (for example, talc and magnesium silicate); flame retardants (for example, brominated flame retardants such as hexabromocyclododecane and brominated polymers, phosphorous flame retardants such as triphenylphosphate, and flame retardant packages that may including synergists such as, or example, dicumyl and polycumyl); lubricants (for example, calcium stearate and barium stearate); acid scavengers (for example, magnesium oxide and tetrasodium pyrophosphate), pigments and blowing agent stabilizer (for example, non-plasticizing polyalkylene-oxide polymers and copolymers including polyethylene glycol (PEG), PEG ethers, polyethylene oxide grafted polystyrene/maleic anhydride (PS/MAH) random copolymers, and ethylene glycol grafted polyurethane random copolymers; non-plasticizing polydimethylsiloxane (PDMS) and non-plasticizing functionalized PDMS including hydroxyl and amine functionalized PDMS; and PS/MAH random copolymers. A blowing agent stabilizer is "non-plasticizing" if it does not significantly lower a polymer composition's glass transition temperature (Tg) when dispersed in the polymer composition at a concentration suitable for use in this invention).

The process of the present invention prepares the polymeric foam article of the present invention. In general, the process comprises: (a) providing at an initial temperature and pressure a foamable polymer composition that comprises a thermoplastic polymer matrix, a nano-sized nucleating additive and a blowing agent wherein the foamable polymer composition is in a softened state that is capable of expanding, but is also at a foaming temperature below the softening temperature of the thermoplastic polymer matrix and the initial pressure is high enough to preclude foaming; and (b) exposing the foamable polymer composition to a pressure below the initial pressure while allowing the foamable polymer composition to expand into a polymeric foam article. The process can further comprise a secondary expansion step after step (b) wherein the polymeric foam article produced in step (b) is further expanded upon heating of the polymeric foam article. The secondary expansion step can occur by, for example, application of steam, radiation (for example, infrared radiation, microwave radiation, radio frequency radiation and ultrasound radiation), subjecting the article to a vacuum or any combination or two or more of these.

The softening temperature for a thermoplastic polymer matrix is the glass transition temperature for an amorphous polymer and the melting temperature for a semi-crystalline polymer. If a thermoplastic polymer matrix comprises more than one continuous amorphous polymer, the softening temperature is the highest glass transition temperature of the continuous amorphous polymers Likewise, if the thermoplastic polymer matrix comprises more than one continuous semicrystalline polymer, the softening temperature is the highest melting temperature of the continuous semicrystalline polymers. If the thermoplastic polymer matrix comprises both continuous amorphous and continuous semicrystalline polymers, the softening temperature is the higher of the highest glass transsistion temperature of the continuous amorphous polymers and the highest melting temperature of the semicrystalline polymers.

The foaming temperature for the foamable polymer composition is a temperature wherein the foamable polymer composition is in a softened state yet is below the softening temperature of the neat thermoplastic polymer matrix of the foamable polymer composition. Desirably, the foaming temperature is 10° C. or more, preferably 20° C. below and can be 30° C. or more below the softening temperature for the neat thermoplastic polymer matrix. The reason the foaming temperature can be so low is because the blowing agent plasticizes the thermoplastic polymer resin thereby lowering the softening temperature of the foamable polymer composition below the softening temperature of the neat thermoplastic polymer.

The thermoplastic polymer matrix and the nano-sized nucleating additive for use in the process of the present invention are as described for the polymeric foam article of the present invention, including all preferred embodiments. The nano-sized nucleating additive is dispersed within the thermoplastic polymer matrix of the foamable polymer composition and the resulting polymeric foam article. The more completely dispersed and the smaller the size of nucleating nano-sized additive the less additive is needed to achieve the desired effective nucleation site density. To be safe, the number of nucleating filler particles typically exceeds the number of effective nucleation sites by a factor of two or more, preferably a factor of five or more.

In a preferred embodiment, step (a) includes mixing the nano-sized nucleating additive into the thermoplastic polymer matrix either before or after mixing in the blowing agent. Desirably, the nano-sized nucleating additive is dispersed well throughout the polymer matrix with as little clumping or clustering of the nano-sized nucleator additive particles as possible in order to maximize nucleation efficiency of the particles. In order to maximize the extent of dispersion of the nano-sized nucleating additive in the polymer matrix, the nano-sized nucleating additive is desirably dispersed into a softened thermoplastic polymer matrix while the nano-sized nucleating agent is in the form of a sol, wet gel, slurry or solution where the nano-sized nucleating additive is already dispersed in a carrier solvent. In one form of this preferred embodiment, the nano-sized nucleating additive sol, wet gel, slurry or solution is mixed into the softened thermoplastic polymer matrix and the carrier solvent is flashed off using heat, vacuum or both heat and vacuum to leave the nano-sized nucleating additive dispersed in the thermoplastic polymer matrix.

As an example of this preferred embodiment, provide a sol, wet gel, slurry or solution of one or more type of nano-sized nucleating additive selected from silica, polyhedral oligomeric silsesquioxanes (POSS), carbohydrates and salts in a carrier solvent such as water and then melt compound the sol, wet gel, slurry or solution directly into the softened thermoplastic polymer matrix. Mix blowing agent into the thermoplastic polymer matrix before, after or during dispersing the nano-sized nucleating additive into the thermoplastic polymer matrix.

The blowing agent can be any blowing agent commonly used for preparing polymeric foam. Suitable blowing agents include one or more than one of the following: inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (for example, difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

Desirably, the blowing agent includes a highly nucleating blowing agent such as carbon dioxide, argon and nitrogen. Such nucleating blowing agents readily nucleate at the nano-sized nucleating additive surfaces to produce a plethora of nucleation sites during foam expansion. Preferably the blowing agent includes carbon dioxide, argon or both carbon dioxide and argon as the primary (highest concentration) blowing agent. Lower solubility gasses with high nucleating power, such as nitrogen, are most suitable as co-blowing agents.

The concentration of total blowing agent in a foamable polymer composition is desirably 18 wt % or more, preferably 20 wt % or more, even more preferably 22 wt % or more and most preferably 24 wt % or more in order to achieve desirable porosity. At the same time, the amount of blowing agent is generally 50 wt % or less, typically 40 wt % or less and often 35 wt % or less. Wt % is relative to total foamable polymer composition weight.

Desirably, carbon dioxide is present at a concentration of 20 wt % or more, preferably 22 wt % or more and most preferably 25 wt % or more. At the same time, carbon dioxide is typically present at a concentration of 50 wt % or less, preferably 40 wt % or less and most preferably 35 wt % or less.

Typically, when carbon dioxide is chosen as the blowing agent, a thermoplastic polymer that enhances carbon dioxide solubility is advantageously present. Of particular interest is a thermoplastic polymer having a range of thermodynamic conditions where the thermoplastic polymer remains rubbery at temperature of about 50° C. below the softening temperature of the matrix polymer without carbon dioxide. Examples of such materials are those found to exhibit retrograde vitrification behavior (RVB), which suppresses glass transitions at high carbon dioxide pressures. (See, for example, Nawaby et al. "Polymer-CO2 Systems Exhibiting Retrograde Behavior and Formation of Nanofoams", Polymer International, vol. 56, (2007) pages 67-73 for further definition and characterization of RVB). Polymers exhibiting RVB are poly(methyl methacrylate) (PMMA), poly(ethyl methacrylate) (PEMA), and acrylonitrile-butadiene-styrene (ABS) copolymer. While beneficial to access broader range of thermodynamic conditions in which solubility is high, polymers exhibiting RVB are neither sufficient, nor necessary to the invention. Hence, the polymeric foam and foamable polymer composition of the present invention may contain polymers exhibiting RVB or may be free of polymers exhibiting RVB.

The foamable polymer composition can contain additionally additives as described for the polymeric foam article of the present invention.

The combination of thermoplastic polymer composition and blowing agent creates a foamable polymer composition. The foamable polymer composition remains under an initial pressure that is sufficient so as to dissolve the blowing agent into the thermoplastic polymer and to preclude foaming of the foamable polymer composition due to expansion of the blowing agent. Once all of the nano-sized nucleating additive, blowing agent and any desirable additional additives are mixed into a foamable polymer composition the foamable polymer composition is rapidly exposed to an atmosphere at a lower pressure than the initial pressure in order to allow foaming to occur. The rate of depressurization can influence the effective nucleating site density. Desirably, the initial rate of pressure decrease is 10 MegaPascals per second (MPa/s) or more, preferably 20 MPa/s or more, more preferably 100 MPa/s or more and most preferably 200 MPa/s or more.

The foamable polymer composition begins expansion at the foaming temperature of the expandable polymer composition. During expansion, the foamable polymer composition expands and cools to form a polymeric foam article. Optionally, an additional conditioning step is beneficial wherein the resulting foam is exposed to further heat and possibly steam to induce additional expansion before becoming a polymeric foam article of the present invention.

Foaming can occur by any foaming technique suitable for preparing thermoplastic polymeric foams including batch tank foaming and extrusion foaming.

In batch tank foaming provide a thermoplastic polymer matrix that contains the nucleating additive into a pressure vessel (tank), provide blowing agent into the vessel and pressurize the inside of the vessel sufficiently high so as to dissolve the blowing agent in the thermoplastic polymer matrix to a desired concentration. Once a desired concentration of blowing agent is dissolved in the thermoplastic polymer matrix the pressure in the vessel is relieved while the thermoplastic polymer matrix is in a softened state at the foaming temperature and the thermoplastic polymer matrix is allowed to expand into a thermoplastic polymeric foam article. Typically, dissolving blowing agent into the thermoplastic polymer matrix under pressure is sufficient to plasticize the thermoplastic polymer matrix into a softened state without requiring heating above the neat polymer matrix softening temperature (softening temperature in an absence of carbon dioxide), although heat may be applied to the tank if necessary to soften the thermoplastic polymer matrix to facilitate foaming.

An extrusion foam process comprises providing a foamable composition in an extruder at an initial pressure and in a softened state and then expelling the foamable composition at a foaming temperature into an environment of lower pressure than the initial pressure to initiate expansion of the foamable composition into a thermoplastic polymer foam. An extrusion process can be continuous or semi-continuous (for example, accumulative extrusion). In a general extrusion process, prepare a foamable polymer composition by mixing a thermoplastic polymer with a blowing agent in an extruder by heating a thermoplastic polymer composition to soften it, mixing a blowing agent composition together with the softened thermoplastic polymer composition at a mixing (initial) temperature and initial pressure that precludes expansion of the blowing agent to any meaningful extent (preferably, that precludes any blowing agent expansion), desirably cool the foamable polymer composition to a foaming temperature rather than use the initial temperature as the foaming temperature, and then expelling the foamable composition through a die into an environment having a temperature and pressure below the foaming temperature and initial pressure. Upon expelling the foamable composition into the lower pressure the blowing agent expands the thermoplastic polymer into a thermoplastic polymer foam. Desirably, cool the foamable composition after mixing and prior to expelling it through the die. In a continuous process, expel the foamable composition at an essentially constant rate into the lower pressure to enable essentially continuous foaming.

Suitable extrusion foam processes may benefit from cooling the foamable polymer composition to a foaming temperature below the initial temperature before expanding and extensive mixing of foamable polymer composition after cooling to the foaming temperature and prior to extrusion.

Accumulative extrusion is a semi-continuous extrusion process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand into foam.

Coalesced strand foam processes are also suitable embodiments of the present extrusion process. In general, during a coalesced strand foam process a foamable polymer composition extrudes through a die containing multiple orifices oriented such that when the foamable polymer composition expands upon extrusion the resulting strands of foaming polymer contact one another and partially coalesce together. The resulting foam article ("strand foam") is a composition of foam strands extending in the extrusion direction of the foam. A skin typically defines each strand in the coalesced strand foam. While coalesced strand foam processes are suitable, the process can be free of forming independent foam strands and then subsequently fusing the strands together to form stand foam.

Extruded foams and batch tank foams are distinct from expanded polymer bead foam by being free from encapsulated collections of beads. While a strand foam has a skin similar to bead foam, the skin of a strand foam does not fully encapsulate groups of cells but rather forms a tube extending only in the extrusion direction of the foam. The polymeric foam articles of the present invention are preferably batch tank polymeric foam (polymeric foam prepared from a batch tank process) or extruded polymeric foams. Desirably the process of the present invention is a batch tank process or an extrusion foam process.

In one embodiment the thermoplastic foam article of the present invention can further have a crosslinked thermoplastic polymer matrix. Crosslinking a thermoplastic polymer matrix can occur upon irradiation of the polymer matrix with the proper frequency radiation. Often, the polymer matrix contains an initiator that instigates crosslinking and/or serves as a crosslinker between polymer chains upon irradiation. Irradiation to achieve crosslinking, if done, typically occurs after all expansion is complete. Irradiation can occur as expansion proceeds, but that is a more difficult process and causes viscosity increase in the polymer matrix during expansion.

Foam article of the present invention have many utilities including serving as thermally insulating articles and filtration articles (for liquids and/or gasses). The thermoplastic foam article of the present invention can be incorporated into a more complex article to form, for example, a thermally insulating composite article comprising a facer (such as a polymeric film), rigid substrate, or both.

EXAMPLES

The following examples illustrate embodiments of the present invention.

Silica Nucleators and Comparative Examples

For Comparative Examples (Comp Exs) A-D use as a thermoplastic polymer matrix PMMA (120,000 g/mol weight average molecular weight from Sigma-Aldrich) without any nano-sized nucleating additive.

For Examples (Exs) 1-6 use a thermoplastic polymer matrix comprising the same PMMA but further comprising silica nano-sized nucleating additive dispersed within the PMMA. The silica nano-sized nucleating additive has a number average silica particle size of approximately 5 nm as dispersed within the thermoplastic polymer matrix for each example. That means the nucleating additive has three orthogonal dimensions that are 5 nm or less, and certainly below 30 nm.

Prepare the silica nano-sized nucleating additive by first preparing a sol by mixing 74 milliliters of tetraethyl orthosilicate (Sigma-Aldrich), 75 milliliters of ethanol (Fischer Scientific) and 55 milliliters of deionized water together while vigorously stirring. Adjust the pH of the mixture to 2.0 by adding 0.5 molar hydrochloric acid. Continue to stir the mixture for 12 hours at approximately 23° C. The resulting sol has a silica nano-sized nucleating additive concentration of about 0.1 grams per milliliter of sol. Convert the sol to a gel by adding approximately 40 milliliters of 0.2 molar ammonium hydroxide to the sol. Gelation takes place in about five minutes at pH of 6.5. The concentration of silica nano-sized nucleating additive in the gel is 0.083 grams per milliliter of gel.

For Exs 1-4 and Ex 6 compound the silica gel into the PMMA by melt blending at 200 degrees Celsius (° C.) in a Haake mixer 15 milliliters of gel per 50 grams of PMMA to achieve three weight parts silica in 100 weight parts PMMA thermoplastic polymer matrix material. For Ex 5 modify the ratio as appropriate to achieve a concentration of 0.5 weight parts silica per 100 weight parts PMMA.

For both the Comp Exs and Ex, compression mold the thermoplastic polymer matrix material at 200° C. and 69 MegaPascals for two minutes into sheets having a thickness as shown in Table 1. Cut the sheets into pieces having a four millimeter width and approximately a 20 millimeter length to use in a batch foaming process.

Prepare polymeric foam articles by a batch foaming process using a high pressure stainless steel vessel connected to a source of pressurized carbon dioxide and containing a pressure release valve. The volume of the vessel is between seven and 55 milliliters. Insert into the vessel the thermoplastic polymer matrix containing silica gel nano-sized nucleating additive so as to fill approximately 5-10% of the vessel volume. Over filling the vessel will preclude sufficient expansion of the polymer during foaming. Seal the vessel with the thermoplastic polymer matrix inside and pressurize the vessel with carbon dioxide to a Soak Pressure and condition to a Soak Temperature. Allow the vessel to remain pressurized for a specific Soak Time and then rapidly release the pressure in the vessel using the pressure release valve to achieve a depressurization rate of at least 20 MegaPascals per second. Inside the vessel, the polymer matrix foams to form a polymeric foam article. For select samples perform a secondary expansion within one minute of depressurization by immersing the polymeric foam article in to a heated water bath at the temperature and for the time indicated in Table 1.

Table 1 lists Soak Pressure (in MegaPascals), Soak Temperature (in ° C.) and Soak time (in hours) for Comp Exs A-E and Exs 1-6.

For Comp Exs C and D and Exs 4-6 subject the polymeric foam article to a secondary expansion step as indicated in Table 1 in order to obtain the final polymeric foam article.

A comparison of Exs 1 and 2 to Comp Exs A and B illustrates how the presence of the silica nano-sized nucleating additive results in a dramatic decrease in average cell size and effective nucleation site density increase at two different Soak Temperatures.

A comparison of Ex 3 to Comp Ex C also illustrates the affect of adding silica nano-sized nucleating additive dramatically reduces average cell size, induces a homogeneous cell size distribution and increases effective nucleation site density when using thicker polymer matrix pieces in the batch process.

A comparison of Comp Ex D and Exs 4 and 5 illustrate the effect of secondary expansion with and without silica nano-sized nucleating additive and reveals that the additive (at both 3 pph loading and 0.5 pph loading) results in a small homogeneous cell size distribution while the absence of the nucleating additive results in larger cells and an inhomogeneous cell size distribution.

A comparison of Comp Ex E and Ex 6 illustrates yet another dramatic difference between foam articles prepared with nano-sized nucleating additive and without nano-sized nucleating additive.

TABLE 1

| Sample | Polymer Matrix Thickness (mm) | Soak Temp (° C.) | Soak Pressure (MPa) | Soak Time (hr) | 2nd Exp'n (Y/N)* | Average Cell Size (μm) | Porosity % | Effective Nucleation Site Density (sites/cm³) | Vol % of cells with >1 μm diam. |
|---|---|---|---|---|---|---|---|---|---|
| Comp Ex A | 0.75 | 40 | 24 | 1 | N/A | 50 | 48 | 7.3 × 10⁶ | 45-48 |
| Ex 1 | 0.75 | 40 | 24 | 1 | N/A | 0.09 | 58 | 3.6 × 10¹⁵ | <1 |
| Comp Ex B | 0.75 | 60 | 24 | 1 | N/A | 80 | 65 | 6.9 × 10⁶ | 60-65 |
| Ex 2 | 0.75 | 60 | 24 | 1 | N/A | 0.3 | 68 | 1.5 × 10¹⁴ | 4 |
| Comp Ex C | 3 | 60 | 30 | 4.5 | N/A | 130/0.9^ | 81 | # | 70-81 |
| Ex 3 | 3 | 60 | 30 | 4.5 | N/A | 0.28 | 77 | 2.9 × 10¹⁴ | 5 |
| Com Ex D | 3 | 40 | 29 | 4.5 | Y(67) | 100/0.4^ | 81 | # | 70-81 |
| Ex 4 | 3 | 40 | 29 | 4.5 | Y(67) | 0.11 | 79 | 5.4 × 10¹⁵ | <1 |
| Ex 5 | 3 | 40 | 29 | 4.5 | Y(67) | 0.12 | 77 | 3.7 × 10¹⁵ | <1 |

TABLE 1-continued

| | Foaming Parameters | | | | | Foam Article Properties | | |
|---|---|---|---|---|---|---|---|---|
| Sample | Polymer Matrix Thickness (mm) | Soak Temp (° C.) | Soak Pressure (MPa) | Soak Time (hr) | 2nd Exp'n (Y/N)* | Average Cell Size (μm) | Porosity % | Effective Nucleation Site Density (sites/cm$^3$) | Vol % of cells with >1 μm diam. |
| Comp Ex E | 3 | 0 | 30 | 11.5 | Y(80) | 0.35 | 57 | $5.9 \times 10^{13}$ | 11 |
| Ex 6 | 3 | 0 | 30 | 11.5 | Y(80) | <0.06 | 70 | $1.3 \times 10^{16}$ | <1 |

*"2$^{nd}$ Exp'n" means Secondary Expansion. N = No secondary expansion. Y(67) = two minute submersion in 67° C. water bath. Y(80) = two minute submersion in 80° C. water bath.
^These samples have a bimodal cell size distribution. The large number corresponds to the average size of the large cells. The small number corresponds to the average size of the small cells.
It is reasonable to calculate an Effective Nucleation Site Density for the samples having a bimodal cell distribution. For some degree of comparative value the nucleation site density calculated as though the entire foam comprised the smaller cell sizes gives a value of $1.1 \times 10^{13}$ and $1.3 \times 10^{14}$ for Comp Ex C and Comp Ex D respectively. It is paramount to keep in mind that the actual effective nucleation site density will be much smaller than these values since these values assume numerous nucleation sites for each large cell.

Carbohydrate and Polyhedral Oligomeric Silsesquioxane (POSS) Nucleators

Prepare the thermoplastic polymer matrix for Examples 7-10 by dissolving the POSS in a polar solvent, in these cases ethanol, to create a three wt % solution of nucleating additive. The POSS nucleator materials are less than approximately one nm in all dimensions. Disperse the solution of nucleating additive into PMMA (as used in Exs 1-6) by adding both the thermoplastic polymer and ethanol solution containing nucleating additive together in a Haake mixer. Add sufficient solution to provide a nucleator concentration in the thermoplastic polymer of 0.25 weight parts per hundred weight parts thermoplastic polymer. Compression mold the resulting thermoplastic polymer matrix into sheets having a thickness of three millimeters at 200° C. and 69 MegaPascals for two minutes. Cut the resulting sheet into pieces that have a width of approximately four millimeters and a length of approximately 20 millimeters.

Prepare polymeric foam from the pieces of thermoplastic copolymer matrix according to the batch foaming process with carbon dioxide used in Exs 1-6.

Table 2 lists Soak Pressure (in MegaPascals), Soak Temperature (in ° C.) and Soak time (in hours) as well as Foam Article Properties for Exs 7-10.

Prepare the thermoplastic polymer matrix for Examples 11-14 in like manner as Examples 7-10 with the following exceptions:

(1) use as a thermoplastic polymer matrix a copolymer that is 50 wt % methylmethacrylate and 50 wt % ethyl methacrylate by monomer weight (310,000 gram/mol weight average molecular weight from Scientific Polymer Products, Inc. for Examples 11-13 and 460,000 gram/mol weight average molecular weight for Example 14); and (2) for Example 11 use sufficient nucleator to provide a nucleator concentration of one weight parts nucleator per hundred weight parts thermoplastic polymer.

Table 3 lists Soak Pressure (in MegaPascals), Soak Temperature (in ° C.) and Soak time (in hours) as well as Foam Article Properties for Exs 11-14.

TABLE 2

| | Foaming Parameters | | | | | Foam Article Properties | | |
|---|---|---|---|---|---|---|---|---|
| Sample | Polymer Matrix Thickness (mm) | Soak Temp (° C.) | Soak Pressure (MPa) | Soak Time (hr) | Secondary Expansion (Y/N)* | Average Cell Size (μm) | Porosity % | Effective Nucleation Site Density (sites/cm$^3$) | Vol % of cells with >1 μm diam. |
| Ex 7 | 3 | 40 | 30 | 5.5 | Y(80) | 0.07 | 71 | $1.3 \times 10^{16}$ | <1 |
| Ex 8 | 3 | 55 | 30 | 4.5 | Y(80) | 0.10 | 78 | $6.6 \times 10^{15}$ | <1 |
| Ex 9 | 3 | 35 | 30 | 7 | Y(60) | 0.08 | 76 | $1.2 \times 10^{16}$ | <1 |
| Ex 10 | 3 | 30 | 32 | 7 | Y(70) | 0.06 | 73 | $2.4 \times 10^{16}$ | <1 |

*Y(T) = three minute submersion in T° C. water bath.

TABLE 3

| Sample | Foaming Parameters ||||| Foam Article Properties ||||
|---|---|---|---|---|---|---|---|---|
| | Polymer Matrix Thickness (mm) | Soak Temp (° C.) | Soak Pressure (MPa) | Soak Time (hr) | Secondary Expansion (Y/N)* | Average Cell Size (μm) | Porosity % | Effective Nucleation Site Density (sites/cm$^3$) | Vol % of cells with >1 μm diam. |
| Ex 11 | 3 | 30 | 33 | 7 | Y(70) | 0.09 | 85 | $1.5 \times 10^{16}$ | <1 |
| Ex 12 | 3 | 35 | 30 | 6 | None | 0.085 | 74.3 | $9.0 \times 10^{15}$ | <1 |
| Ex 13 | 3 | 50 | 33 | 4.5 | Y(85) | 0.11 | 85.3 | $8.3 \times 10^{15}$ | 2 |
| Ex 14 | 3 | 35 | 30 | 6 | None | 0.07 | 70 | $1.3 \times 10^{16}$ | <1 |

*Y(T) = three minute submersion in T° C. water bath.

Styrene-Acrylonitrile Copolymer Examples

Prepare thermoplastic polymeric foam articles using styrene-acrylonitrile (SAN) copolymer (TYRIL® 125, TYRIL is a trademark of The Dow Chemical Company). SAN is a polymer that does not demonstrate retrograde vitrification behavior. Begin by preparing the thermoplastic polymer matrix. For Comp Ex F use the SAN copolymer without a nucleating additive. For Ex 15, compound into the SAN copolymer POSS at a concentration of 0.25 parts per 100 weight parts SAN copolymer by dissolving POSS into ethanol to form a three weight-percent solution of POSS relative to ethanol and then blending the solution with the SAN copolymer in a Haake mixer. For both Comp Ex F and Ex 15 compression mold the thermoplastic polymer matrix into a sheet having a thickness of three millimeters. Cut the resulting sheet into pieces that have a width of approximately four millimeters and a length of approximately 20 millimeters.

Prepare polymeric foam from the pieces of thermoplastic copolymer matrix according to the batch foaming process with carbon dioxide used in Exs 1-6.

Table 4 summarizes the process and results for the SAN copolymer foam articles.

TABLE 4

| Sample | Foaming Parameters ||||| Foam Article Properties ||||
|---|---|---|---|---|---|---|---|---|
| | Polymer Matrix Thickness (mm) | Soak Temp (° C.) | Soak Pressure (MPa) | Soak Time (hr) | Secondary Expansion (Y/N)* | Average Cell Size (μm) | Porosity % | Effective Nucleation Site Density (sites/cm$^3$) | Vol % of cells with >1 μm diam. |
| Comp Ex F | 3 | 30 | 33 | 20 | Y(60) | 2 | 68 | $4.7 \times 10^{11}$ | 60-68 |
| Ex 15 | 3 | 30 | 33 | 20 | Y(60) | 0.180 | 67 | $6.6 \times 10^{14}$ | <1 |

*Y(60) = three minute submersion in 60° C. water bath.

Ex 15 illustrates that polymeric foam article of the present invention are also achievable using polymers that do not have retrograde vitrification properties. A comparison of Ex 15 to Comp Ex F further illustrates the surprising reduction in cell size and surprising increase in Effective Nucleation site Density resulting from including nucleating additive in the thermoplastic polymer matrix during foaming, even a polymer not having retrograde vitrification properties.

What is claimed is:

1. A polymeric foam article comprising a thermoplastic polymer matrix defining multiple cells therein, wherein the polymeric foam article has the following characteristics:

a. the thermoplastic polymer matrix contains dispersed within it nano-sized nucleating additive particles that have all dimensions that are less than 30 nanometers in length;
   b. possesses at least one of the following two characteristics:
      i. has an effective nucleation site density of at least $3 \times 10^{14}$ sites per cubic centimeter of pre-foamed material; and
      ii. has an average cell size of 300 nanometers or less; and
   c. has a porosity percentage of more than 50 percent
   where the thermoplastic polymer matrix comprises a continuous thermoplastic polymer that is either a single amorphous thermoplastic polymer or blend of multiple thermoplastic polymers that forms a single amorphous phase and wherein the continuous thermoplastic polymer is 100 weight-percent of the polymer in the thermoplastic polymer matrix and wherein the polymeric foam article is further characterized by having a thickness of greater than one millimeter and by being free of a non-foamed skin and by having a homogeneous cell size distribution.

2. The polymeric foam article of claim 1, further characterized by having an effective nucleation site density of at least $3 \times 10^{14}$ sites per cubic centimeter of pre-foamed material.

3. The polymeric foam article of claim 1, wherein the foam article has an average cell size of 200 nanometers or less and the volume percent of cells larger than one micron is 10 percent or less relative to total foam volume.

4. The polymeric foam article of claim 1, further characterized by the nucleating additive, as dispersed in the thermoplastic polymer matrix, having an a number average particle size of 30 nanometers or less.

5. The polymeric foam article of claim 1, further characterized by having a porosity percentage of more than 80%.

6. The polymeric foam article of claim 1, wherein the thermoplastic polymer matrix comprises a continuous phase of non-fluorinated polymers.

7. The polymeric foam article of claim 1, wherein the thermoplastic polymer matrix is free of a polycarbonate continuous phase.

8. The polymeric foam article of claim 1, wherein the polymeric foam article is free of: fluorinated materials, a polycarbonate continuous phase, a polyether imide continuous phase, a polyether sulfone continuous phase and a polylactic acid continuous phase.

9. The polymeric foam article of claim 1, wherein the foam article has a width, length and thickness each of which is greater than one millimeter in magnitude.

10. The polymeric foam article of claim 1, wherein the concentration of nano-sized nucleating additive is in a range from 10 weight parts per million weight parts of thermoplastic polymer matrix to 20 weight parts per hundred weight parts of thermoplastic polymer matrix.

11. The polymeric foam article of claim 1, therein the thermoplastic polymer matrix comprises crosslinked thermoplastic polymers.

12. A process for preparing the polymeric foam article of claim 1, the process comprising:
   a. providing at a foaming temperature and initial pressure a foamable polymer composition that comprises a thermoplastic polymer matrix, a nano-sized nucleating additive and a blowing agent containing at least one blowing agent selected from carbon dioxide, nitrogen and argon, where at the foaming temperature the foamable polymer composition is in a softened state and the initial pressure is high enough to preclude foaming; and
   b. rapidly exposing the foamable polymer composition to a pressure below the initial pressure while allowing the foamable polymer composition to expand into a polymeric foam article;
wherein the nano-sized nucleating additive has all dimensions that are less than 30 nanometers and is dispersed within the thermoplastic polymer matrix and where the thermoplastic polymer matrix comprises a continuous thermoplastic polymer that is either a single amorphous thermoplastic polymer or blend of multiple thermoplastic polymers that forms a single amorphous phase and wherein the continuous thermoplastic polymer is 100 weight-percent of the polymer in the thermoplastic polymer matrix and wherein the polymeric foam article is further characterized by having a thickness of greater than one millimeter and by being free of a non-foamed skin and by having a homogeneous cell size distribution.

13. The process of claim 12, further comprising heating the polymeric foam article of step (b) to achieve a secondary expansion of the polymeric foam article.

14. The process of claim 12, wherein step (a) includes dispersing nano-sized nucleating additive into the thermoplastic polymer matrix while the nano-sized nucleating additive is in a solvent as a sol, wet gel, slurry or solution.

15. The process of claim 14, wherein the nano-sized nucleating additive is selected from a group consisting of silica, oligomeric silsesquioxanes, carbohydrates and salts, wherein the solvent is evaporated leaving the nucleating additive dispersed within the thermoplastic matrix and having at least two dimensions that are less than 30 nanometers.

16. The process of claim 12, wherein the process is an extrusion process and step (b) occurs by extruding the foamable polymer composition through a foaming die.

17. The process of claim 12, wherein the blowing agent comprises at least 20 weight-percent carbon dioxide based on total foamable polymer composition weight.

18. The process of claim 12, wherein all dimensions of the nano-sized nucleating additive are 10 nanometers or less.

19. The process of claim 12, wherein the nano-sized nucleating additive has a number average particle size of 30 nanometers or less in a dispersed form in the thermoplastic polymer matrix.

20. The process of claim 12, further comprising a step (c) that occurs during or after allowing the foamable polymer composition to expand into a polymeric foam article and during or after any desirable secondary expansion, step (c) comprising irradiating the polymeric foam article to induce crosslinking of the thermoplastic polymer matrix.

* * * * *